US010272921B2

(12) United States Patent
Edgington et al.

(10) Patent No.: US 10,272,921 B2
(45) Date of Patent: Apr. 30, 2019

(54) ENRICHED CONNECTED CAR ANALYSIS SERVICES

(71) Applicant: International Business Machines Corporation, Armonk, NY (US)

(72) Inventors: Jeffrey L. Edgington, Keller, TX (US); Kristina E. Jones, Dallas, TX (US); Hung Tack Kwan, Grand Prairie, TX (US); Shiju Mathai, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 14/834,479

(22) Filed: Aug. 25, 2015

(65) Prior Publication Data
US 2017/0057492 A1 Mar. 2, 2017

(51) Int. Cl.
*B60K 28/06* (2006.01)
*B60W 40/08* (2012.01)

(52) U.S. Cl.
CPC ........... *B60W 40/08* (2013.01); *B60K 28/066* (2013.01); *B60W 2040/0836* (2013.01); *B60W 2540/24* (2013.01); *B60W 2540/28* (2013.01); *B60W 2540/30* (2013.01); *B60W 2550/402* (2013.01)

(58) Field of Classification Search
USPC ....................................................... 701/1, 41
See application file for complete search history.

(56) References Cited

U.S. PATENT DOCUMENTS

| 8,355,934 | B2* | 1/2013 | Virdhagriswaran ........................ G06Q 10/067 705/35 |
| 8,554,468 | B1* | 10/2013 | Bullock .................. G01S 19/14 701/408 |
| 8,892,451 | B2 | 11/2014 | Everett et al. |
| 9,628,286 | B1* | 4/2017 | Nguyen ........... G08B 13/19678 |
| 2005/0137753 | A1* | 6/2005 | Basson ................ B60K 28/066 701/1 |
| 2006/0026017 | A1* | 2/2006 | Walker ................... G06Q 10/00 701/31.4 |
| 2006/0206246 | A1* | 9/2006 | Walker ................... G06Q 10/00 701/16 |
| 2007/0073477 | A1* | 3/2007 | Krumm ............. G01C 21/3617 701/423 |
| 2007/0106550 | A1* | 5/2007 | Umblijs ............. G06Q 10/0631 705/7.12 |
| 2007/0128899 | A1* | 6/2007 | Mayer ................... G06F 9/4406 439/152 |

(Continued)

FOREIGN PATENT DOCUMENTS

DE 102006054574 A1 * 11/2006
WO WO 2010107394 A1 * 9/2010 ......... G01C 21/3492

OTHER PUBLICATIONS

Google patents machine translation of Rataj.*

(Continued)

*Primary Examiner* — Jean Paul Cass
(74) *Attorney, Agent, or Firm* — Isaac J. Gooshaw (57) ABSTRACT

Contextualizing vehicle data and predicting real-time driver actions. By unsiloing collected data relating to a driver, the actions of the driver can be predicted and the reasons for variations from the predicted actions can be determined based on the contextualized data.

9 Claims, 5 Drawing Sheets

(56) References Cited

U.S. PATENT DOCUMENTS

| | | | |
|---|---|---|---|
| 2008/0177994 A1* | 7/2008 | Mayer | G06F 9/4418 |
| | | | 713/2 |
| 2008/0249667 A1* | 10/2008 | Horvitz | B60W 40/072 |
| | | | 701/1 |
| 2010/0030586 A1* | 2/2010 | Taylor | G06Q 30/02 |
| | | | 705/4 |
| 2010/0228584 A1 | 9/2010 | Nash | |
| 2013/0262349 A1* | 10/2013 | Bouqata | G06N 99/005 |
| | | | 706/12 |
| 2014/0067800 A1 | 3/2014 | Sharma | |
| 2014/0277835 A1* | 9/2014 | Filev | G01C 21/3469 |
| | | | 701/2 |
| 2014/0278586 A1 | 9/2014 | Sanchez et al. | |
| 2014/0292504 A1 | 10/2014 | Cook et al. | |
| 2014/0309806 A1* | 10/2014 | Ricci | B60Q 1/00 |
| | | | 701/1 |
| 2014/0309849 A1* | 10/2014 | Ricci | B60Q 1/00 |
| | | | 701/33.4 |
| 2014/0358326 A1 | 12/2014 | Phelan et al. | |
| 2015/0046197 A1 | 2/2015 | Peng et al. | |
| 2015/0052074 A1* | 2/2015 | Reynolds | G06Q 50/265 |
| | | | 705/325 |
| 2015/0066341 A1* | 3/2015 | Von Holt | G08G 1/096716 |
| | | | 701/117 |
| 2015/0180746 A1* | 6/2015 | Day, II | H04L 51/16 |
| | | | 455/405 |
| 2015/0193885 A1* | 7/2015 | Akiva | G06Q 40/08 |
| | | | 705/4 |
| 2016/0012301 A1* | 1/2016 | Arndt | B60W 50/14 |
| | | | 382/104 |
| 2016/0039426 A1* | 2/2016 | Ricci | H04W 4/21 |
| | | | 701/1 |
| 2016/0104486 A1* | 4/2016 | Penilla | H04L 67/12 |
| | | | 704/232 |
| 2016/0171521 A1* | 6/2016 | Ramirez | G06Q 30/0224 |
| | | | 701/409 |
| 2016/0196756 A1* | 7/2016 | Prakash | B64C 39/024 |
| | | | 701/3 |
| 2016/0363935 A1* | 12/2016 | Shuster | B60L 7/10 |
| 2017/0006135 A1* | 1/2017 | Siebel | H04L 67/02 |
| 2017/0039890 A1* | 2/2017 | Truong | G09B 19/167 |
| 2017/0072850 A1* | 3/2017 | Curtis | B60W 50/0097 |
| 2017/0149795 A1* | 5/2017 | Day, II | H04W 4/02 |
| 2018/0165936 A1* | 6/2018 | Smith | G06F 11/30 |

OTHER PUBLICATIONS

Peng et al., "Novel Vehicle Motion Model Considering Driver Behavior for Trajectory Prediction and Driving Risk Detection", Journal of the Transportation Research Board, No. 2434, Transportation Research Board of the National Academies, Washington, D.C., 2014, printed Aug. 24, 2015, pp. 123-134.

Popov et al., "Using Data-Centric Predictive Analytics to Improve Driver Safety", Work Truck Online, Sep. 2007, Work Truck— Feature; Printed on: May 6, 2015, © 2015 Work Truck Online, pp. 1-6, <http://www.worktruckonline.com/channel/safety-accident-management/article/story/2007/09/using-data-centric-predictive-analytics-to-improve-driver-safety.aspx>.

Rajagopal, Balu, "Real-time Insights on Driving Patterns from Big Data—The Next Frontier for Competitive Advantage for Automakers", Data Science Central, Jan. 29, 2013, © 2015 Data Science Central, pp. 1-7, <http://www.datasciencecentral.com/profiles/blogs/real-time-insights-on-driving-patterns-from-big-data-the-next>.

"Position and Movement Analytics for Understanding Driver Behavior", Retrieved May 8, 2009, A VisTracks Position Brief, VisTracks, Inc. Company Proprietary, pp. 1-6.

* cited by examiner

ENRICHED CONNECTED CAR ANALYSIS SERVICES

BACKGROUND

The present invention relates generally to the field of motor vehicles, and more particularly to promoting the safety of a vehicle.

Telematics is a field related to vehicle tracking, more specifically monitoring vehicles as they transit. However, telematics is limited in that it only deals with the transmission of signals and messages to and from a vehicle. Telematics can be used to analyze events that occur during transit, such as accidents. However, in performing this analysis, a significant amount of context is missing.

SUMMARY

According to an aspect of the present invention, there is a method, computer program product, and/or system that performs the following operations (not necessarily in the following order): (i) determining a driver of a vehicle based, at least in part, on a set of data collected from a set of vehicle data sensors; (ii) gathering a set of context data from the set of vehicle data sensors and a set of external data sensors; and (iii) predicting a set of actions to be taken by the driver based, at least in part, on the set of context data. At least the determining operation is performed by computer software running on computer hardware.

DETAILED DESCRIPTION

Contextualizing vehicle data and predicting real-time driver actions. By unsiloing collected data relating to a driver, the actions of the driver can be predicted and the reasons for variations from the predicted actions can be determined based on the contextualized data. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
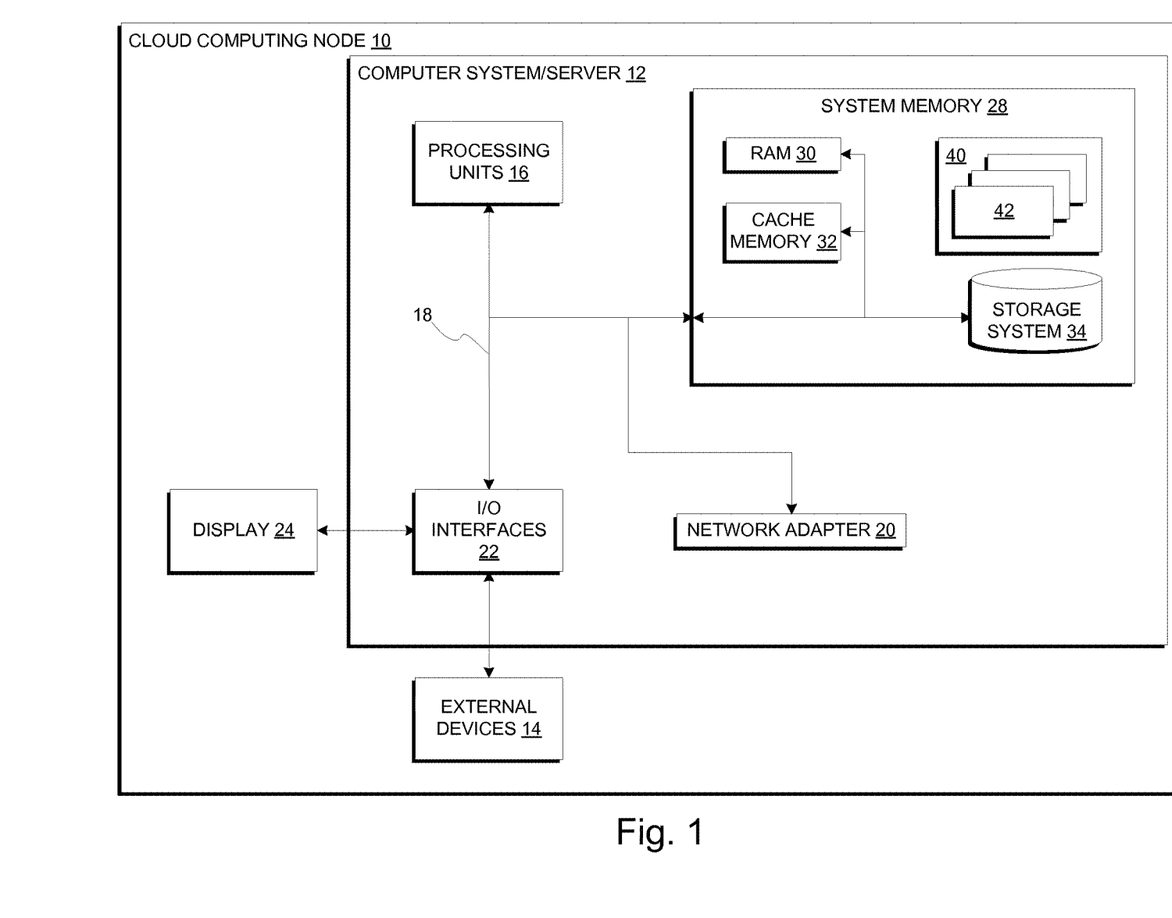
FIG. 1 depicts a cloud computing node used in a first embodiment of a system according to the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having set of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Set of program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
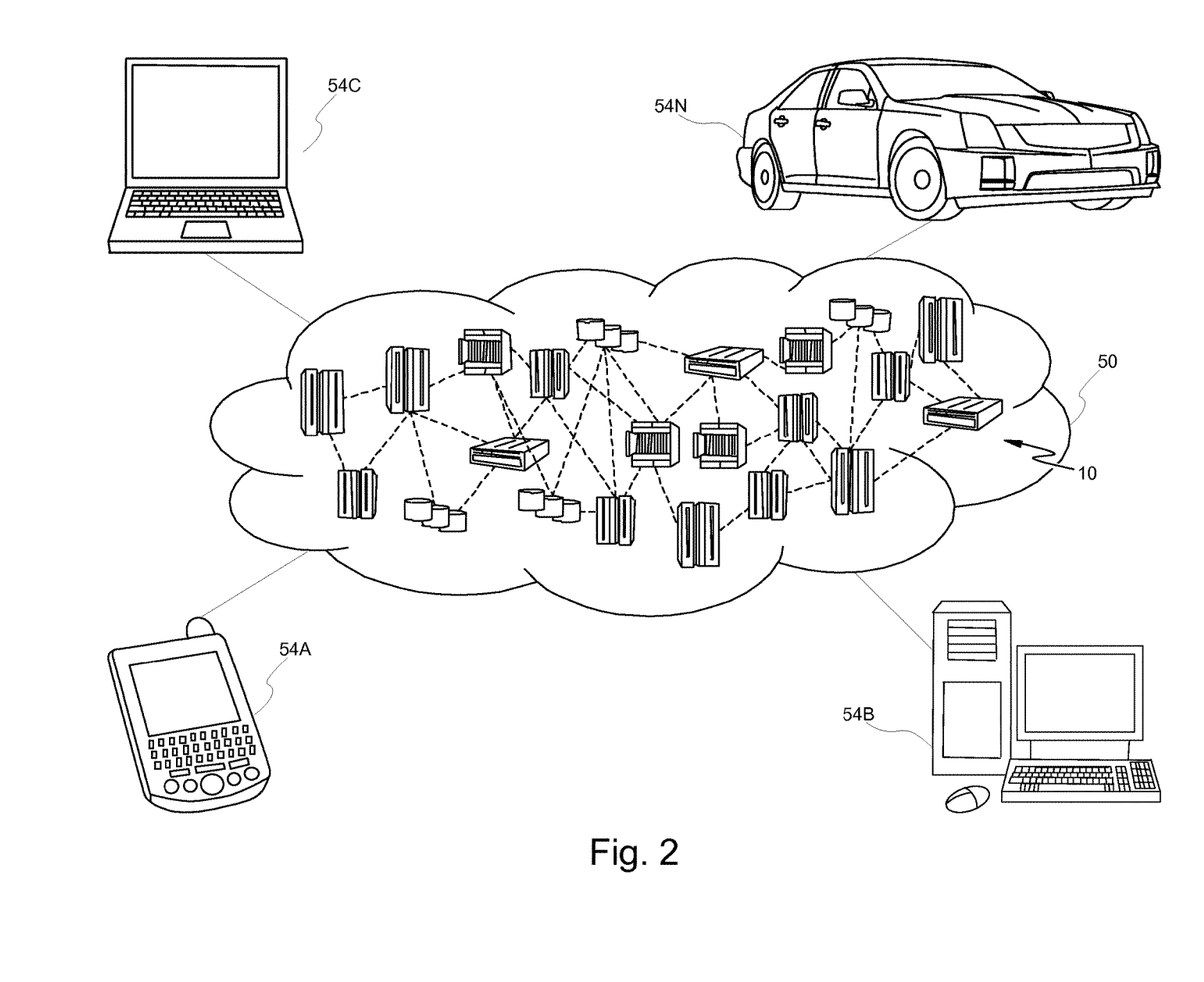
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes (e.g., cloud computing node 10) with which local computing devices used by cloud consumers, such as, for example, personal digital assistant (PDA) or cellular telephone 54A, desktop computer 54B, laptop computer 54C, and/or automobile computer system 54N may communicate.

Cloud computing nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing node 10 and cloud computing environment 50 can communicate with any type of computerized device over any type of network and/or network addressable connection (e.g., using a web browser).

Figure 3:
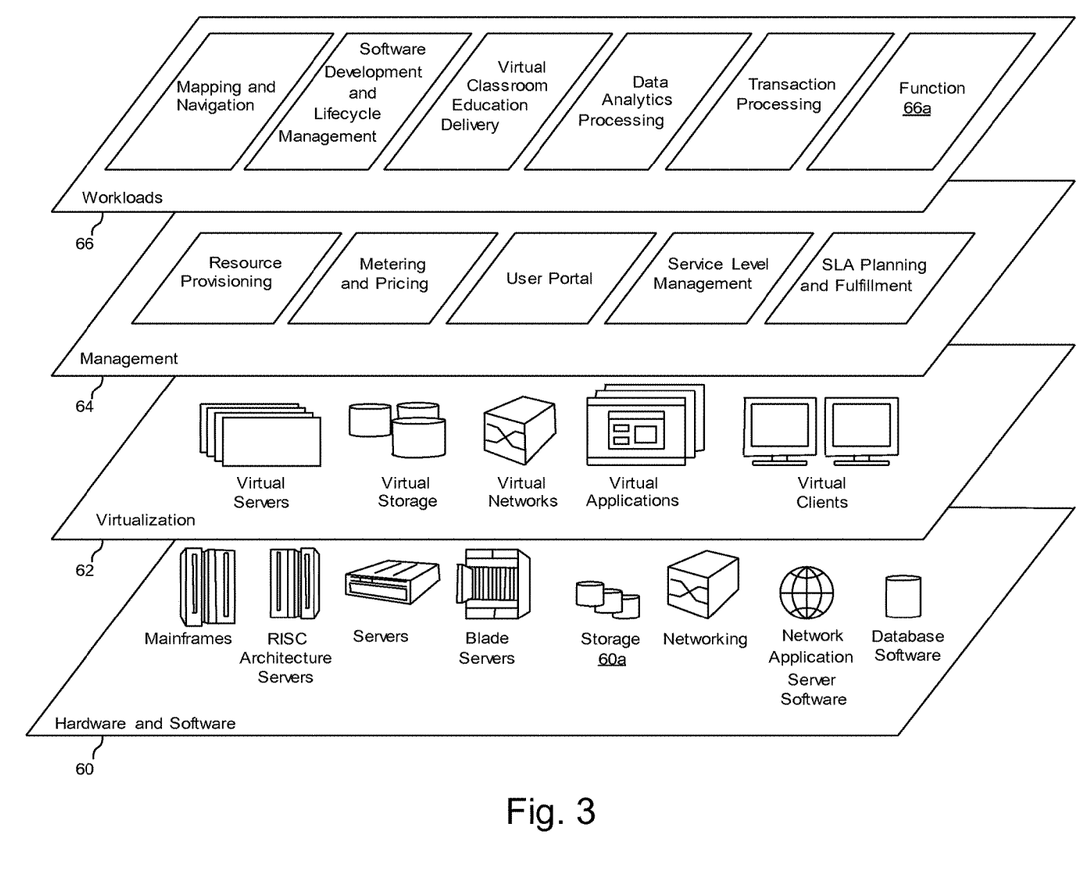
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
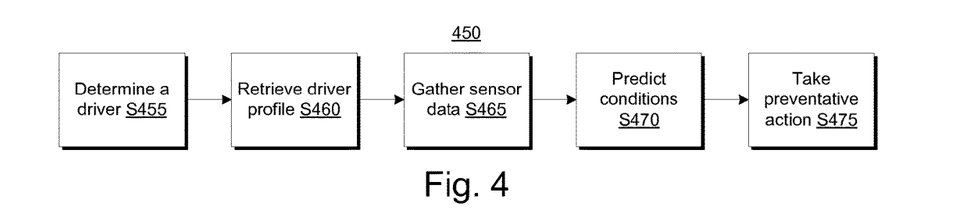
FIG. 4 is a flowchart showing a first embodiment method performed, at least in part, by the first embodiment system.
Figure 5:
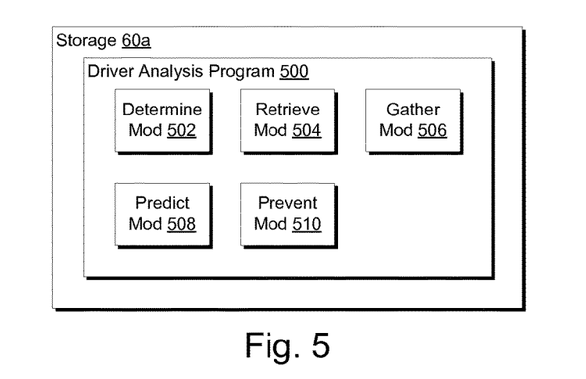
FIG. 5 is a block diagram view of a machine logic (for example, software) portion of the first embodiment system.

FIG. 4 shows flowchart 450 depicting a method according to the present invention. FIG. 5 shows driver analysis program 500, which performs at least some of the method operations of flowchart 450. This method and associated software will now be discussed, over the course of the following paragraphs, with extensive reference to FIG. 4 (for the method operation blocks) and FIG. 5 (for the software blocks). One physical location where driver analysis program 500 of FIG. 5 may be stored is in storage block 60a (see FIG. 3). In this example, computer system/server 12 analyzes a driver, Ted, who is operating a family vehicle that he shares with his wife and their eldest child. The vehicle contains a set of sensors (not separately shown in the Figures).

Processing begins at operation S455, where determine module ("mod") 502 determines a driver. In this example, computer system/server 12 determines that Ted is driving the vehicle. Computer system/server 12 makes this determination based, at least in part, on biometric data collected from the set of sensors within the vehicle. Here, the set of sensors includes a fingerprint reader that identifies Ted. In some embodiments of the present invention, the set of sensors includes a variety of biometric sensors, including, but not limited to: (i) a heart rate monitor; (ii) a retinal scanner; (iii) a facial recognition system; (iv) a palm print reader; (v) an infrared scanner; (vi) microphones; and/or (vii) any other system able to assist in identifying a driver based, at least in part, on biometric data. Alternatively, the set of sensors includes a variety of sensors that assists in identifying a driver without requiring biometric data. For example, a numeric keypad requesting a personal identification number (PIN) is a sensor that does not require biometric data. In some embodiments of the present invention, computer system/server 12 determines a driver before the driver enters a vehicle. Alternatively, computer system/server 12 determines a driver after the driver enters the vehicle.

Processing proceeds to operation S460, where retrieve mod 504 retrieves a driver profile. In this example, computer system/server 12 retrieves Ted's profile from driver profile storage 620. Alternatively, computer system/server 12 does not collect driver profiles in a single location. As this is Ted's family vehicle, computer system/server 12 already has a profile for him. Alternatively, the first time Ted drove this vehicle, computer system/server 12 did not have a driver profile stored in driver profile storage 620. At that time, computer system/server 12 created a driver profile for Ted and stored the profile in driver profile storage 620.

Processing proceeds to operation S465, where gather mod 506 gathers a set of sensor data. In this example, computer system/server 12 gathers a set of sensor data from various sources, including, but not limited to: (i) a set of onboard sensors within Ted's vehicle; (ii) a set of onboard sensors within a different vehicle with which Ted's vehicle shares the roadway; (iii) a set of mobile computing devices (e.g., Ted's cellphone, Ted's wearable device, etc.); (iv) a set of roadway sensors, being sensors monitoring the roadway on which Ted is driving (e.g., traffic light controls); and/or (v) a set of external sensors, being sensors monitoring external conditions (e.g., weather). In some embodiments of the present invention, computer system/server 12 uses the data from these sensors to create a context that corresponds to an event that occurs while Ted is driving.

Processing proceeds to operation S470, where predict mod 508 predicts a set of conditions. In this example, computer system/server 12 generates a prediction about Ted's driving based, at least in part, on the set of sensor data gathered in operation S465. For example, Ted's driver profile (retrieved in operation S460) notes that he usually drives within five miles per hour over the posted speed limit; however, computer system/server 12 gathered data from the set of external sensors showing that it is currently late evening and raining. Therefore, computer system/server 12 predicts that Ted will drive slower than the posted speed limit. Computer system/server 12 also predicts other aspects of Ted's driving based, at least in part, on Ted's driver profile and the gathered sensor data, including, but not limited to: (i) frequent destinations; (ii) frequent routes; (iii) use of turn signals; (iv) use of seatbelts; (v) travel speed relative to the posted speed limit; (vi) music preference and signal source (e.g., radio, satellite, wireless device, etc.); (vii) tuning of music; (viii) cellphone use; (ix) seat position; (x) driving reaction time; (xi) driving distance buffer with other vehicles; (xii) biometric measurements during driving; and/or (xiii) sleep patterns.

Processing terminates at operation S475, where prevent mod 510 takes a preventative action. In this example, computer system/server 12 receives readings from a plurality of sensors that show variations from the generated prediction about Ted's driving. For example, computer system/server 12 receives information from the set of sensors in Ted's vehicle that Ted: (i) took a different route home from work; (ii) stopped at a new destination (which computer system/server 12 determines is a drinking establishment); (iii) is not wearing a seatbelt; (iv) is driving at ten miles per hour above the speed limit; (v) is making sudden lane changes; (vi) is not using turn signals; and (vii) is texting while driving. In some embodiments of the present invention, computer system/server 12 also analyzes global positioning system (GPS) data for the vehicle and local traffic patterns. Computer system/server 12 determines that Ted's driving is unsafe and will lead to injuries (both to Ted and to others). Computer system/server 12 informs Ted that he is not driving within the prediction made by computer system/server 12 in step S470 and that Ted should exercise caution. Computer system/server 12 transmits a preventative warning to other drivers around Ted to be aware that he poses a risk. Computer system/server 12 also transmits a preventative warning to emergency services and the local department of transportation. For example, if Ted is driving the wrong way on a roadway, the department of transportation should close the road to oncoming traffic.

III. Further Comments and/or Embodiments

Some embodiments of the present invention recognize the following facts, potential problems, and/or potential areas for improvement with respect to the current state of the art: (i) telematics programs do not include contextual information in analysis of events and data; and/or (ii) telematics programs cannot properly account for the overall risk causing an event.

Figure 6:
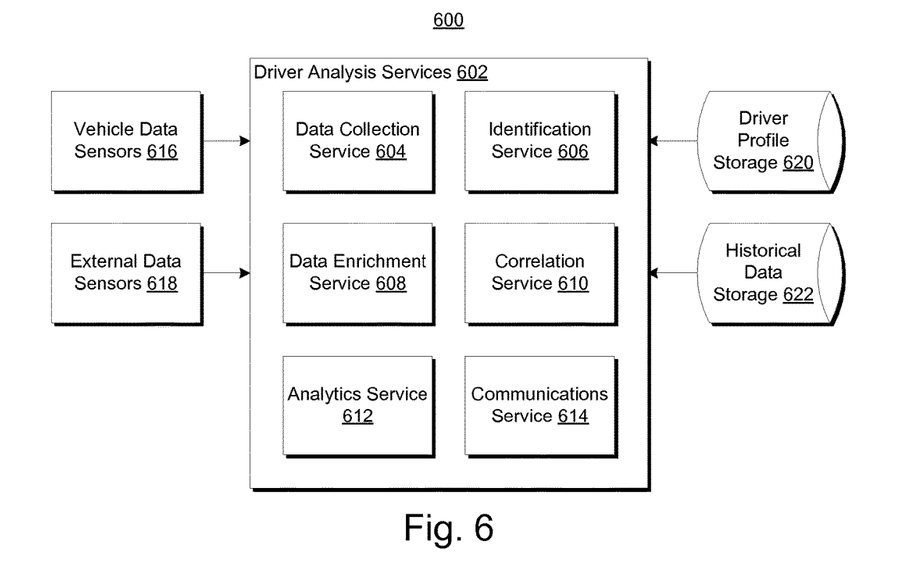
FIG. 6 is block diagram view of a second embodiment of a system according to the present invention.

FIG. 6 depicts driver analysis environment 600. Driver analysis environment 600 contains: driver analysis services 602; vehicle data sensors 616; external data sensors 618; driver profile storage 620; and historical data storage 622. Driver analysis services 602 contains: data collection service 604; identification service 606; data enrichment service 608; correlation service 610; analytics service 612; and communications service 614. In this example, driver analysis services 602 operates an embodiment of a driver analysis program and provides associated services.

Data collection service 604 collects a set of data from a variety of sensors, including, but not limited to, vehicle data sensors 616 and external data sensors 618. In some embodiments of the present invention, data collection service 604 incorporates: (i) telematics data (e.g., date and time, vehicle position, vehicle velocity, vehicle acceleration, fuel level, gas mileage, radio and other internal media usage, etc.); (ii) sensor data (e.g., seat position, in car cameras, alcohol sensors, gyroscopic sensor, airbag, onboard computer etc.); (iii) biometric data (e.g., fingerprint or handprint, retinal scan, iris scan, in-seat scale, keypad entry, thermal sensor, heart rate monitor, respiratory monitor, eye-tracking camera, etc.); and/or (iv) external data (e.g., red light cameras, toll plaza cameras, electronic toll collection sensors, weather, roadway sensors, traffic light plates, roadway scales, mobile computing devices, wearable computing devices, etc.). In some embodiments of the present invention, data collection service 604 collects data from a plurality of vehicles in parallel.

Vehicle data sensors 616 generally captures data within the vehicle. In some embodiments of the present invention, vehicle data sensors 616 captures data from sensors integrated in the vehicle. Alternatively, vehicle data sensors 616 includes its own set of sensors. In some embodiments of the present invention, vehicle data sensors 616 captures data from mobile computing devices inside the vehicle, including wearable computing devices.

External data sensors 618 generally captures data external to the vehicle. In some embodiments of the present invention, external data sensors 618 captures data from sensors integrated into the environment in which the vehicle is located, for example, a red light camera mounted at a traffic intersection. Alternatively, external data sensors 618 is integrated into sensors provided for transmitting data to driver analysis services 602.

Identification service 606 identifies a driver of the vehicle. In some embodiments of the present invention, identification service 606 also compares the driver to a set of driver profiles stored in driver profile storage 620. In some embodiments of the present invention, identification service 606 identifies the driver based on biometric data. Alternatively, identification service 606 identifies the driver based on an input. In further embodiments of the present invention, identification service 606 identifies the driver based on non-biometric sensor data. In some embodiments of the present invention, identification service 606 compares a set of data collected by data collection service 604 to the set of driver profiles to identify the driver. In some embodiments of the present invention, identification service 606 identifies a driver profile as "anonymous," while still correlating the driver with the driver profile. In some embodiments of the present invention, identification service 606 updates the driver profile when it identifies the driver. In some embodiments of the present invention, identification service 606 creates a profile for a driver and stores that profile in driver profile storage 620.

Driver profile storage 620 stores profiles of drivers. In some embodiments of the present invention, driver profile storage 620 exists on the same device as driver analysis services 602. Alternatively, driver profile storage 620 exists on a device networked with or electronically connected to the device on which driver analysis services 602 exists. In further embodiments of the present invention, driver profile storage 620 and driver analysis services 602 are each cloud computing nodes connected over a network. In some embodiments of the present invention, driver profile storage 620 exists in various locations with synchronization capabilities. In some embodiments of the present invention, synchronization occurs at a regular interval. In some embodiments of the present invention, driver profile storage 620 exists both within the vehicle and as a cloud computing node with each location maintaining a complete set of driver profiles. In some embodiments of the present invention, a driver profile includes data collected by data collection service 604 while that driver was driving the vehicle. In some embodiments of the present invention, driver profile storage 620 contains a single driver profile for a driver having driven multiple vehicles.

Data enrichment service 608 enhances the data collected by data collection service 604 for further use. In some embodiments of the present invention, data enrichment service 608 performs real-time processing of data collected by data collection service 604. In some embodiments of the present invention, data enrichment service 608 contextualizes the data collected by data collection service 604. For example, data collection service 604 collects: (i) a current vehicle speed of 5 miles per hour below the speed limit; and (ii) a current weather condition including rain. In this example, data enrichment service 608 puts the vehicle speed value into context by combining the two data readings such that the "5 miles per hour below the speed limit" datum is not isolated from the "rain" datum. In some embodiments of the present invention, data enrichment service 608 incorporates historical data stored in historical data storage 622. In some embodiments of the present invention, data enrichment service 608 determines additional context based on the historical data stored in historical data storage 622. For example, data enrichment service 608 determines that a vehicle traveling 20 miles per hour below the speed limit on a highway is stuck in traffic due to an accident. In this example, data enrichment service 608 made this determination based on similar historical data stored in historical data storage 622; data enrichment service 608 distinguished traffic due to an accident from traffic due to construction based on the length of time the vehicle was traveling at a reduced speed. In some embodiments of the present invention, data enrichment service 608 analyzes social networks to gather additional contextual information. For example, data enrichment service 608 looks at social network statuses to determine if the driver has been mentioned as a poor or aggressive driver. Data enrichment service 608 also analyzes social networks to determine if the vehicle (based on the license plate) has been mentioned in traffic incidents. In some embodiments of the present invention, data enrichment service 608 searches public records to determine a citation history for the driver (e.g., speeding tickets, moving violations, etc.). In some embodiments of the present invention, data enrichment service 608 searches insurance claims to determine an accident history for the driver.

Historical data storage 622 stores historical data collected by data collection service 604. In some embodiments of the present invention, historical data storage 622 exists on the same device as driver analysis services 602. Alternatively, historical data storage 622 exists on a device networked with or electronically connected to the device on which driver analysis services 602 exists. In further embodiments of the present invention, historical data storage 622 and driver analysis services 602 are each cloud computing nodes connected over a network.

Correlation service 610 correlates the enriched data from data enrichment service 608 to the driver identified by identification service 606. In some embodiments of the present invention, correlation service 610 ignores portions of a driver profile based on the current vehicle the driver is driving. For example, a driver owns a sedan and a truck. When the driver is driving the truck, some information stored in the driver profile about the driver's behavior while driving the sedan (e.g., gas mileage, mirror placement, etc.) is irrelevant to the driver's current situation in the truck. Other information remains relevant, regardless of the vehicle the driver is driving (e.g., seat belt usage, level of alcohol intoxication, etc.). In some embodiments of the present invention, correlation service 610 determines the data most useful in predicting future outcomes for the driver.

Analytics service 612 performs real-time analysis on the correlated data. In some embodiments of the present invention, analytics service 612 analyzes a set of real-time actions to determine deviations from an expected set of conditions. In some embodiments of the present invention, analytics service 612 performs real-time predictive analysis on data enriched by data enrichment service 608 and correlated by correlation service 610. In some embodiments of the present invention, analytics service 612 performs a variety of analysis tasks including, but not limited to: (i) analysis of telematics data (e.g., vehicle speed, airbags, etc.); (ii) behavior analytics of a driver; (iii) driving history analysis; (iv) pattern analytics (e.g., current behavior compared to historical behavior); (v) analysis of gyroscopic sensor events; (vi) textual analytics of documents and records (e.g., previous accident reports, fines, vehicle maintenance records, etc.); (vii) video analysis; (viii) correlation with GPS history; and/or (ix) correlation with camera events. In some embodiments of the present invention, analytics service 612 identifies and predicts real-time conditions and situations. In some embodiments of the present invention, analytics service 612 contains presets determining a set of conditions that warrant real-time communication and/or analysis. In some embodiments of the present invention, analytics service 612 determines a set of conditions that warrant real-time communication and/or analysis based on a set of inputs. In some embodiments of the present invention, analytics service 612 determines a set of conditions that warrant real-time communication and/or analysis based on the recipient of the output from analytics service 612. In some embodiments of the present invention, analytics service 612 determines a set of conditions that warrant real-time communication and/or analysis based on the delivery mechanism for the output from analytics service 612. In some embodiments of the present invention, analytics service 612 delivers the output from analytics service 612 to communications service 614. In some embodiments of the present invention, analytics service 612 determines that communication of the output from analytics service 612 is not required in real-time. In some embodiments of the present invention, analytics service 612 stores the output from analytics service 612 in driver profile storage 620 and/or historical data storage 622.

Communications service 614 performs communication actions between driver analysis services 602 and a variety of groups and individuals. In some embodiments of the present invention, communications service 614 communicates with the driver. In some embodiments of the present invention, communications service 614 suggests the driver take a corrective action and/or a mitigative action. In some embodiments of the present invention, communications service 614 communicates with a public safety system (e.g., department of transportation, emergency medical services, police force, etc.). In some embodiments of the present invention, communications service 614 informs a public safety service of a predicted accident or incident. In some embodiments of the present invention, communications service 614 communicates with other drivers and/or other vehicles. In some embodiments of the present invention, communications service 614 suggests that other drivers and/or other vehicles take preventative safety measures. In some embodiments of the present invention, communications service 614 communicates directly with existing traffic signage.

Some embodiments of the present invention may include one, or more, of the following features, characteristics, and/or advantages: (i) provides real-time analysis of vehicles; (ii) provides real-time insight into drivers; (iii) provides proactive solutions to prevent accidents; and/or (iv) provides enhanced safety for others.

Some embodiments of the present invention may include one, or more, of the following features, characteristics, and/or advantages: (i) analyzes driving behavior analysis; (ii) creates a driver profile; (iii) analyzes a driver history; (iv) analyzes current road conditions; (v) analyzes camera footage; (vi) analyzes car maintenance; and/or (vii) analyzes current traffic conditions.

Some embodiments of the present invention may include one, or more, of the following features, characteristics, and/or advantages: (i) incorporating sensor readings into an overall calculation of risk; (ii) providing real-time analytics to predict a driver's actions; (iii) providing real-time analytics to determine deviations from normal behavior; (iv) providing real-time insight into a driver's behavior; (v) taking proactive action to prevent dangerous situations; and/or (vi) enhancing the safety of various drivers.

Some embodiments of the present invention may include one, or more, of the following features, characteristics, and/or advantages: (i) creating a driver profile based, at least in part, on behavioral characteristics and/or driving patterns; (ii) utilizing social media to determine context of geographic locations; (iii) capturing data from a variety of sources; (iv) contextualizing data that is otherwise "siloed," or used for one purpose without being shared among other data processing elements; (v) performing real-time analytics; (vi) performing analytics "at the edge," that is, at the extremes of a network; (vii) performing analytics in a vehicle in real-time; (viii) enabling and supporting intelligent decision making; (ix) compiling, analyzing, and/or predicting conditions in real-time; and/or (x) mitigating factors tending to lead to accidents, injuries, and/or deaths. In some embodiments of the present invention, behavioral characteristics and/or driving patterns include, but are not limited to: (i) frequent destinations; (ii) frequent routes; (iii) turn signal usage; (iv) travel speed relative to the posted speed limit; (v) radio and/or other music usage; (vi) manipulation of non-driving controls (e.g., radio, air conditioning, etc.); (vii) cellular telephone usage; (viii) hands-free device usage; (ix) text messaging; (x) seat position; (xi) seat belt usage; (xii) weather-based driving behavior; (xiii) time-based driving behavior; (xiv) traffic-based driving behavior; (xv) reaction times; (xvi) vehicle following distance; (xvii) biological responses (e.g., heart rate, breathing rate, etc.); and/or (xviii) driving behavior based on sleep patterns.

Some embodiments of the present invention may include one, or more, of the following features, characteristics, and/or advantages: (i) accounting for a variety of factors that lead to accidents, including, but not limited to, intoxicated drivers, drowsy drivers, underage drivers, visibility, etc.; (ii) allowing for intercommunication of previously siloed data; (iii) flagging conditions within a vehicle to which the driver should be alert; (iv) analyzing historical driving data to create context; and/or (v) analyzing data external to a vehicle to create context.

Some embodiments of the present invention may include one, or more, of the following features, characteristics, and/or advantages: (i) identification of a driver using sensors; (ii) identification of a driver using biometrics; (iii) identification of a driver using telematics; and/or (iv) identification of an "anonymous" driver, that is a driver having a driver profile, but not referenced by name and/or some other identifying characteristic.

Some embodiments of the present invention may include one, or more, of the following features, characteristics, and/or advantages: (i) analyzing driver behavior and/or patterns using contextual information; (ii) calculating driver behavior and/or patterns using contextual information; (iii) predicting driver behavior and/or patterns using contextual information; and/or (iv) storing driver behavior and/or patterns using contextual information.

Some embodiments of the present invention may include one, or more, of the following features, characteristics, and/or advantages: (i) creating a driver profile for a identified driver; (ii) matching an existing driver profile with a identified driver; (iii) logging data from a driving session for a driver; (iv) associating data for a driving session with a driver and/or a driver profile; and/or (v) identifying a set of behavioral characteristics for a driver.

Some embodiments of the present invention may include one, or more, of the following features, characteristics, and/or advantages: (i) collection of data regarding a vehicle from within the vehicle; (ii) collection of data regarding a driver from within the vehicle; and/or (iii) collection of data regarding a vehicle location from within the vehicle.

Some embodiments of the present invention may include one, or more, of the following features, characteristics, and/or advantages: (i) use of telematics data to predict driving outcomes; (ii) use of GPS data to predict driving outcomes; (iii) use of sensor data to predict driving outcomes; (iv) use of biometric data to predict driving outcomes; (v) use of area demographic data to predict driving outcomes; and/or (vi) use of visual recording data (e.g., from in-vehicle cameras, from red light cameras, etc.) to predict driving outcomes.

Some embodiments of the present invention may include one, or more, of the following features, characteristics, and/or advantages: (i) determining an actionable response based on real-time analytics; (ii) communicating an actionable response to a driver; (iii) communicating an actionable response to other drivers and/or other vehicles; and/or (iv) communicating an actionable response to a public safety system (e.g., department of transportation, emergency medical services, police force, etc.).

Some embodiments of the present invention may include one, or more, of the following features, characteristics, and/or advantages: (i) providing real-time feedback; (ii) communicating with a driver via a mobile application; (iii)

communicating with a driver via a system integrated into the vehicle; (iv) communicating with a public safety system to determine a number of emergency vehicles required; and/or (v) communicating with an insurance provider; (vi) communicating with a department of transportation to take corrective and/or preventative actions (e.g., alerting others to a driver traveling the wrong way, etc.).

Some embodiments of the present invention may include one, or more, of the following features, characteristics, and/or advantages: (i) determining if a driver is intoxicated; (ii) determining if a driver is under the influence of alcohol; (iii) determining if a driver is under the influence of a controlled substance; (iv) determining if a driver is under the influence of a prescription medication; (v) determining if a driver is asleep; and/or (vi) determining if a driver is drowsy.

Some embodiments of the present invention may include one, or more, of the following features, characteristics, and/or advantages: (i) analyzing a roadway infrastructure; (ii) analyzing a current roadway condition; (iii) determining current roadway construction; (iv) analyzing roadway maintenance; (v) analyzing a vehicle GPS history; (vi) determining a vehicle maintenance history; (vii) determining a driver citation history; and/or (viii) determining a driver insurance claim history.

IV. Definitions

"Present invention" does not create an absolute indication and/or implication that the initial set of claims covers the described subject matter, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A method comprising:
    determining, by one or more processors, an identity of a driver of a vehicle based, at least in part, on biometric sensor data of the driver;
    identifying, by the one or more processors, a profile of the driver based, at least in part, on the identity of the driver, wherein the profile of the driver includes one or more of the following types of information regarding the driver: (i) frequent destinations; (ii) frequent routes; and (iii) travel speed relative to the posted speed limit;
    receiving, by the one or more processors, onboard sensor data from one or more sensors mechanically coupled to the vehicle;
    receiving, by the one or more processors, external sensor data from one or more sensors not mechanically coupled to the vehicle, wherein the external sensor data is gathered from one or more of the following devices: (i) one or more red light cameras; (ii) one or more toll plaza cameras; (iii) one or more electronic toll collection sensors; (iv) one or more roadway sensors; (v) one or more traffic light plates; and (vi) one or more roadway scales;
    retrieving, by the one or more processors, social network information associated with the driver, wherein the social network information includes one or more social network messages related to the driver;
    determining, by the one or more processors, contextual information of the one or more social network messages related to the driver;

determining, by the one or more processors, a condition associated with the driver based, at least in part, on an analysis of (i) the profile of the driver, (ii) the onboard sensor data, (iii) the external sensor data, and (iv) the contextual information of the one or more social network messages related to the driver; and in response to the predicted condition associated with the driver matching a known hazardous condition, initiating, by the one or more processors, a preventive action to mitigate the known hazardous condition from occurring.

2. The method of claim 1, wherein the biometric sensor data is gathered from one or more of the following devices: (i) a heart rate monitor; (ii) a respiratory monitor; (iii) an eye-tracking camera; (iv) a retinal scanner; (v) a facial recognition system; (vi) a palm print reader; (vii) an infrared scanner; and (viii) one or more microphones.

3. The method of claim 2, the method further comprising:
determining, by the one or more processors, the condition associated with the driver based, at least in part, on an analysis of the biometric sensor data regarding the driver.

4. A computer program product comprising:
one or more computer-readable storage media and program instructions stored on the one or more computer-readable storage media, the program instructions comprising:
program instructions to determine an identity of a driver of a vehicle based, at least in part, on biometric sensor data of the driver;
program instructions to identify a profile of the driver based, at least in part, on the identity of the driver, wherein the profile of the driver includes one or more of the following types of information regarding the driver: (i) frequent destinations; (ii) frequent routes; and (iii) travel speed relative to the posted speed limit;
program instructions to receive onboard sensor data from one or more sensors mechanically coupled to the vehicle;
program instructions to receive external sensor data from one or more sensors not mechanically coupled to the vehicle, wherein the external sensor data is gathered from one or more of the following devices: (i) one or more red light cameras; (ii) one or more toll plaza cameras; (iii) one or more electronic toll collection sensors; (iv) one or more roadway sensors; (v) one or more traffic light plates; and (vi) one or more roadway scales;
program instructions to retrieve social network information associated with the driver, wherein the social network information includes one or more social network messages related to the driver;
program instructions to determine contextual information of the one or more social network messages related to the driver;
program instructions to determine a condition associated with the driver based, at least in part, on an analysis of (i) the profile of the driver, (ii) the onboard sensor data, (iii) the external sensor data, and (iv) the contextual information of the one or more social network messages related to the driver; and
in response to the predicted condition associated with the driver matching a known hazardous condition, program instructions to initiate a preventive action to mitigate the known hazardous condition from occurring.

5. The computer program product of claim 4, wherein the biometric sensor data is gathered from one or more of the following devices: (i) a heart rate monitor; (ii) a respiratory monitor; (iii) an eye-tracking camera; (iv) a retinal scanner; (v) a facial recognition system; (vi) a palm print reader; (vii) an infrared scanner; and (viii) one or more microphones.

6. The computer program product of claim 5, the program instructions further comprising:
program instructions to determine the condition associated with the driver based, at least in part, on an analysis of the biometric sensor data regarding the driver.

7. A computer system comprising:
one or more computer processors;
one or more computer readable storage media; and
program instructions stored on the computer readable storage media for execution by at least one of the one or more processors, the program instructions comprising:
program instructions to determine an identity of a driver of a vehicle based, at least in part, on biometric sensor data of the driver;
program instructions to identify a profile of the driver based, at least in part, on the identity of the driver, wherein the profile of the driver includes one or more of the following types of information regarding the driver: (i) frequent destinations; (ii) frequent routes; and (iii) travel speed relative to the posted speed limit;
program instructions to receive onboard sensor data from one or more sensors mechanically coupled to the vehicle;
program instructions to receive external sensor data from one or more sensors not mechanically coupled to the vehicle, wherein the external sensor data is gathered from one or more of the following devices: (i) one or more red light cameras; (ii) one or more toll plaza cameras; (iii) one or more electronic toll collection sensors; (iv) one or more roadway sensors; (v) one or more traffic light plates; and (vi) one or more roadway scales;
program instructions to retrieve social network information associated with the driver, wherein the social network information includes one or more social network messages related to the driver;
program instructions to determine contextual information of the one or more social network messages related to the driver;
program instructions to determine a condition associated with the driver based, at least in part, on an analysis of (i) the profile of the driver, (ii) the onboard sensor data, (iii) the external sensor data, and (iv) the contextual information of the one or more social network messages related to the driver; and
in response to the predicted condition associated with the driver matching a known hazardous condition, program instructions to initiate a preventive action to mitigate the known hazardous condition from occurring.

8. The computer system of claim 7, wherein the biometric sensor data is gathered from one or more of the following devices: (i) a heart rate monitor; (ii) a respiratory monitor; (iii) an eye-tracking camera; (iv) a retinal scanner; (v) a facial recognition system; (vi) a palm print reader; (vii) an infrared scanner; and (viii) one or more microphones.

9. The computer system of claim 8, the program instructions further comprising:

program instructions to determine the condition associated with the driver based, at least in part, on an analysis of the biometric sensor data regarding the driver.

* * * * *